US006719667B2

(12) United States Patent
Wong et al.

(10) Patent No.: US 6,719,667 B2
(45) Date of Patent: Apr. 13, 2004

(54) WEIGHT-SCALE APPARATUS AND METHOD

(75) Inventors: Philip Lim-Kong Wong, Geddington (GB); Ka Yiu Sham, Great Falls, VA (US)

(73) Assignee: Acumen, Inc., Sterling, VA (US)

( * ) Notice: Subject to any disclaimer, the term of this patent is extended or adjusted under 35 U.S.C. 154(b) by 139 days.

(21) Appl. No.: 10/051,170

(22) Filed: Jan. 22, 2002

(65) Prior Publication Data

US 2002/0098951 A1 Jul. 25, 2002

Related U.S. Application Data

(60) Provisional application No. 60/262,419, filed on Jan. 19, 2001.

(51) Int. Cl.[7] ............................................. A63B 22/02
(52) U.S. Cl. ...................................................... 482/54
(58) Field of Search ............................ 482/51, 54, 89, 482/900–902; 119/700

(56) References Cited

U.S. PATENT DOCUMENTS 5,368,532 A * 11/1994 Farnet .......................... 482/54
6,110,073 A * 8/2000 Saur et al. ...................... 482/8

\* cited by examiner

*Primary Examiner*—Glenn E. Richman
(74) *Attorney, Agent, or Firm*—Crowell & Moring LLP

(57) ABSTRACT

An improved treadmill having a weight-scale sensor and a console display which displays a history of weight loss or weight control based upon goals set over a period of time in order to facilitate an enclosed loop system for a weight loss monitoring program.

9 Claims, 6 Drawing Sheets

Fig. 2  Schematic of the Weight-Scale Module

Weight Scale Function Chart

Weight-Scale Program Flowchart

Weight Loss Control Flow Chart

WEIGHT-SCALE APPARATUS AND METHOD

This application claims the priority of U.S. Provisional Application No. 60/262,419, filed Jan. 19, 2001, the disclosures of which is expressly incorporated by reference herein.

BACKGROUND AND SUMMARY OF THE INVENTION

The present invention relates to an apparatus which incorporates a weight-scale module in a treadmill to facilitate a "closed loop system" for a weight loss monitoring program, and to a weight loss monitoring method which utilizes the unique features of that apparatus.

An effective weight control program which is based upon treadmill exercise can express the calories lost in carrying out such a program with the following general expression.

$$\text{Kcal./sec.} = [\{\text{weight} \times (\text{speed} \times 50 + 66)\} \times \{1 + 0.005 \, (\text{age} - 30)\} \times \text{gender factor}]/1{,}000{,}000 \, (\text{or } 10^6), \text{ where the gender-factor is male} = 100\%, \text{ and female} = 90\%. \quad (1)$$

It can be seen from the above expression, in calories to be computed for each exercise, that the user has to input into the treadmill memory at the beginning of the exercise his or her current body weight, age and gender. With a weight-scale module built into or retrofitted in a treadmill, an up-to-date body weight can be measured on the spot, and the calories lost can be automatically computed therefrom if gender and age are also stored in memory or separately inputted.

An object of the present invention is to provide an apparatus and weight loss monitoring method whereby weight control progress can be periodically correlated with regular workout activities on a treadmill or other similar exercise equipment.

A further object of the present invention is to provide a method and apparatus which is easily used by a novice but which also serves the more sophisticated requirements of experienced exercise equipment users.

These objects have been achieved by the use of a weight-scale sensor which can be incorporated in conventional treadmills or retrofitted to treadmills with a console display which displays a history and shows a history of weight loss or control based upon goals set over a period of time such as a week or a month.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
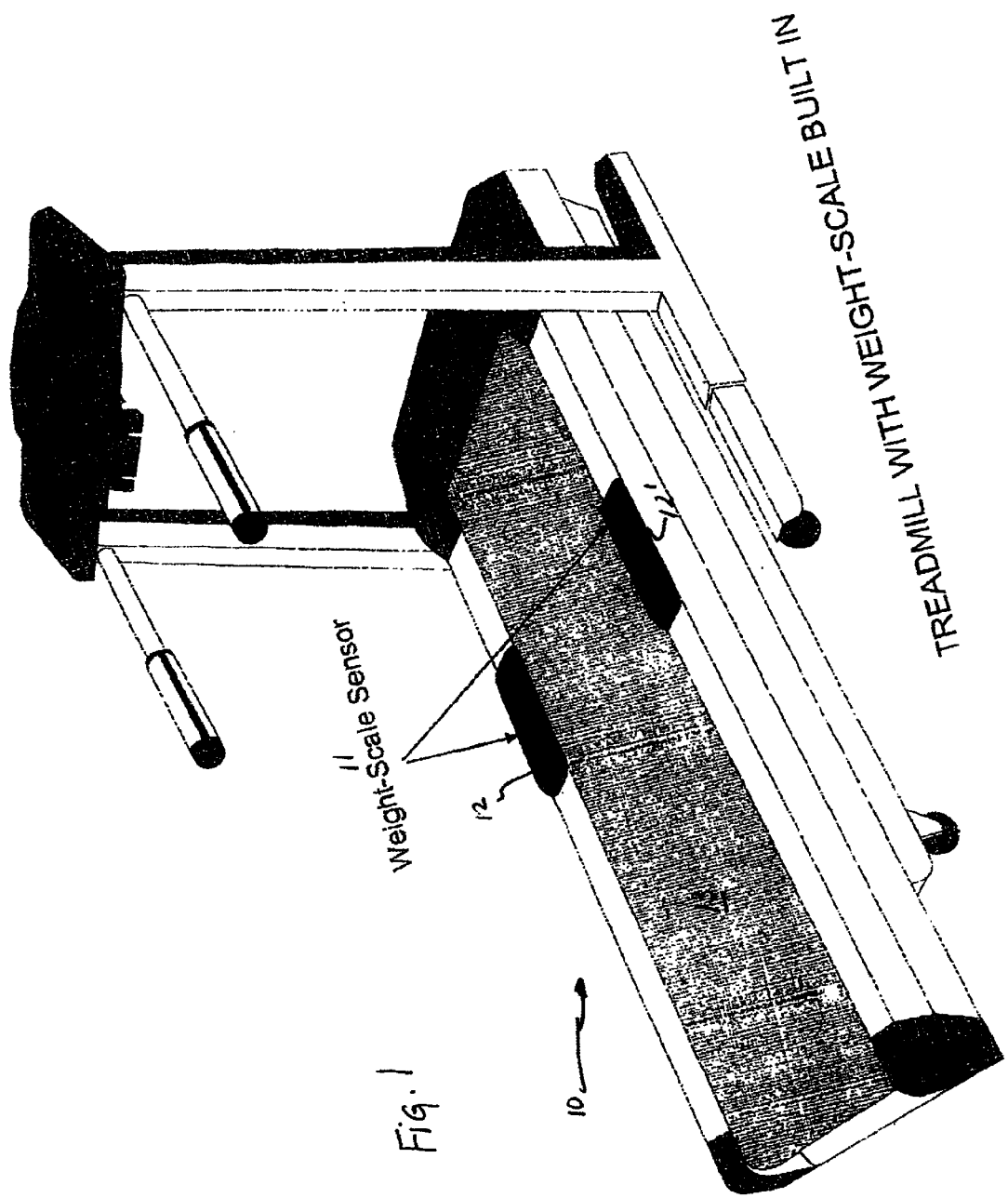
FIG. 1 is a perspective view of a treadmill with a weight-scale sensor module built in or retrofitted thereto.
Figure 2:
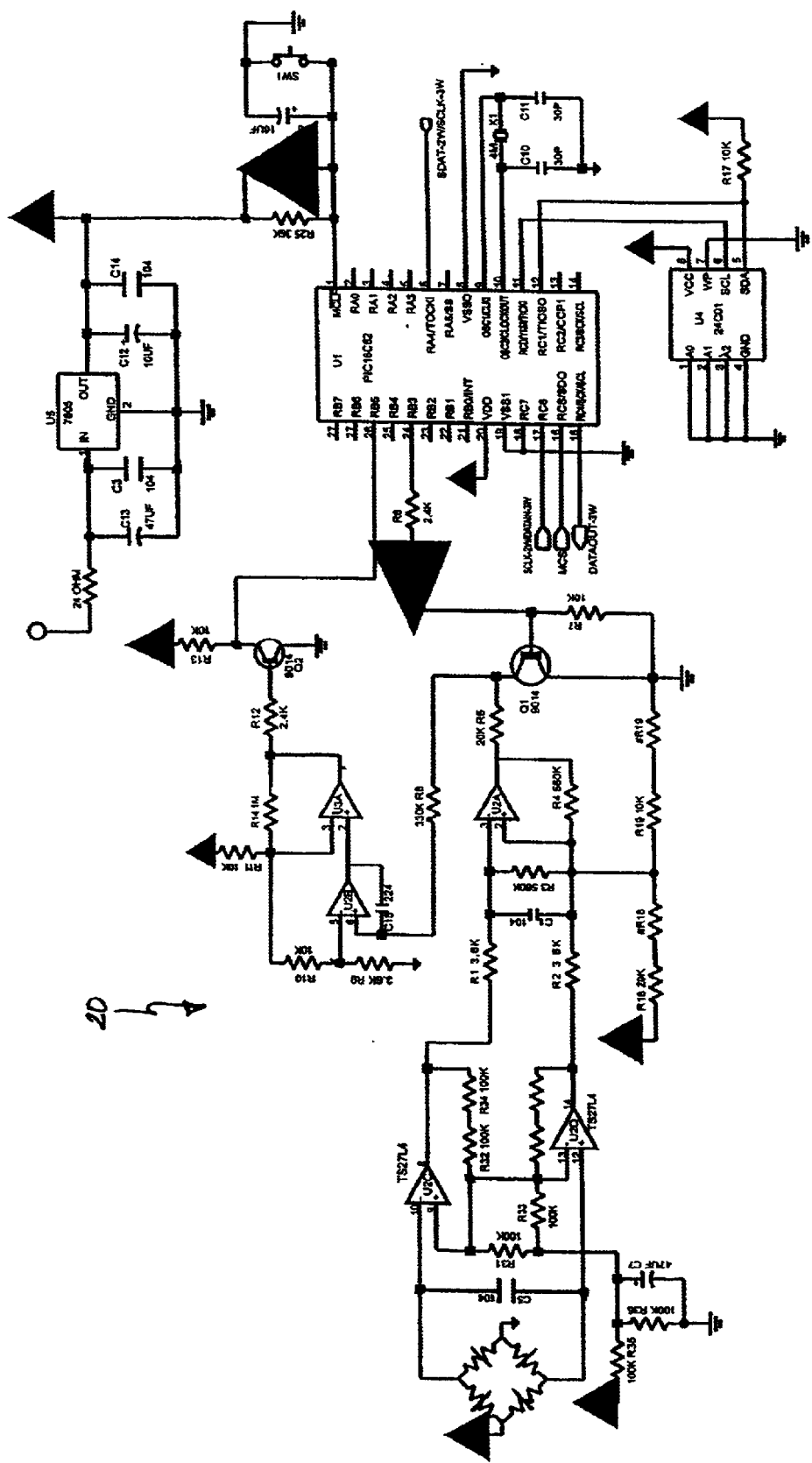
FIG. 2 is a schematic diagram of the circuit of the weight-scale sensor module as shown in FIG. 1.

The treadmill 10 shown in FIG. 1 has a weight-scale sensor 11 which has a pad or the like 12, 12' on each side of the belt 13 for the exerciser to place his or her left foot and right foot, respectively, for inputting body weight by way of the circuit 20 shown in FIG. 2. Thereby, the treadmill user automatically inputs his or her current body weight of the beginning of the exercise. The general expression (1) is used as the algorithm in the system electronics and/or software to calculate calories burned during the exercise as seen in the flow chart of FIG. 3.

The weight-scale circuit of FIG. 2 contains three functional portions. In the first portion, the bridge-configuration load cell 210 provides for a difference signal which is proportional to a weight being measured by the sensor 11. This difference signal is converted into a DC voltage level by the instrumentation amplifier formed by U2A, U2C and U2D, which provides a measured output signal at the collector of the transistor Q1. In the second portion of the circuit, the microcontroller U1 provides analog to time interval conversion on an incoming signal, weight calculation and other system communication. The microcontroller U1 functions, at a pre-determined time interval, to switch the transistor Q1 to the "ON" state. That is, it clamps the DC signal voltage level at the collector to ground voltage of Q1, which initiates an integration cycle to reset the input of an integrator. This integrator U2B is followed by threshold comparator U3A. When Q1 is subsequently turned "OFF", the measured DC signal at the collector of Q1 is restored. A DC level-to-integration time conversion is initiated until the ramp output from the integrator reaches the reference threshold of the U3A comparator. The time measured between the U1 reset pulse to the reaching of the U3A comparator threshold is computed by U1 as the weight being measured.

This cycle of integrator reset and comparator threshold triggering measurement is repeated to provide the weight measurement and is under the control of the microcontroller U1. The weight-scale module 20 is supplied by a 5 volt voltage which is regulated by the circuitry and linear regulator U5 to provide a stabilized 5 volt for the weight-scale circuit board.

Figure 3:
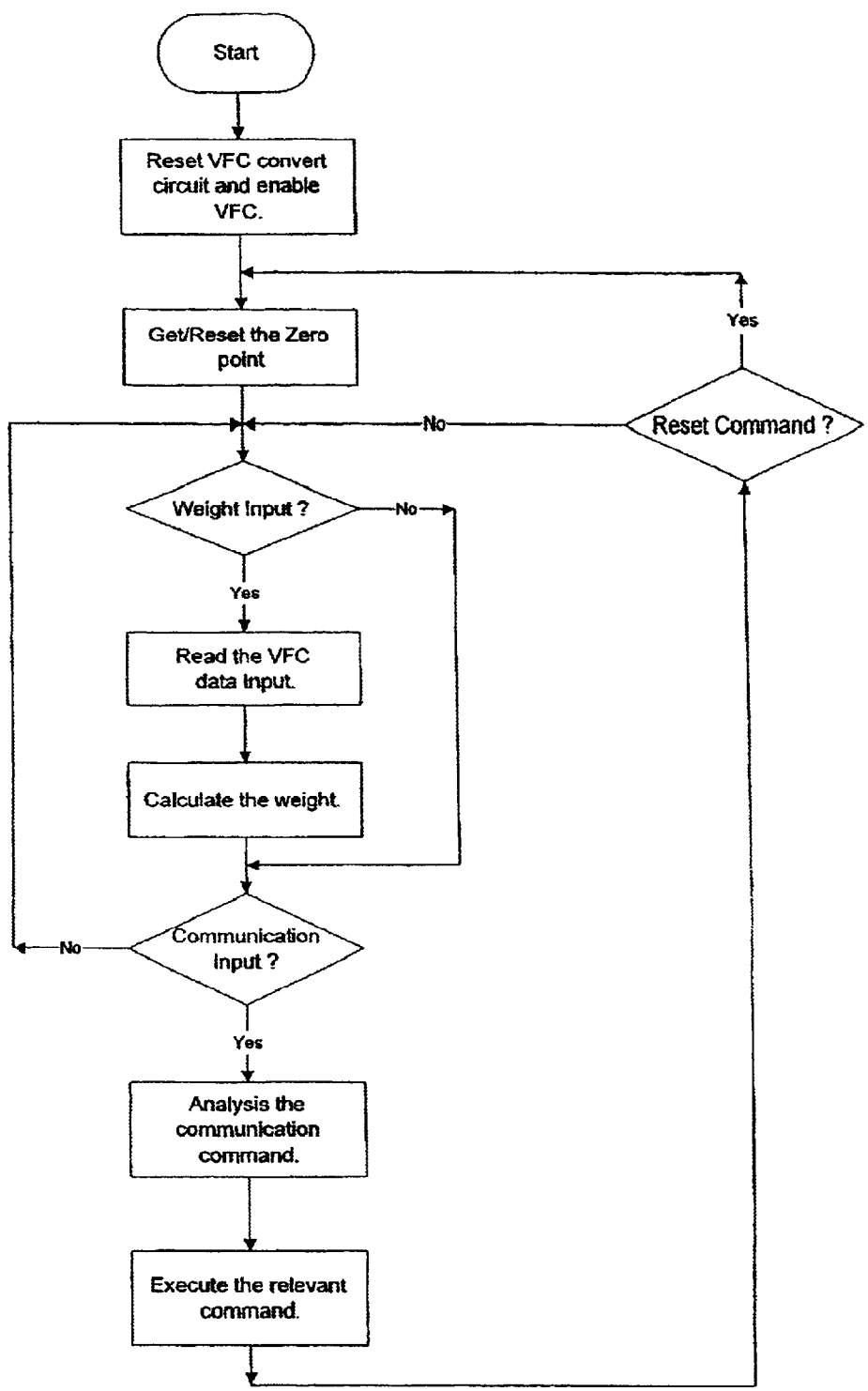
FIG. 3 is a flow chart of a typical weight-scale program used as part of the present invention.

As a result of the exerciser being positioned on the weight sensor, the weight-scale module automatically inputs his or her current body weight at the beginning of the exercise. The general expression (1) is used as the algorithm in the system electronics and/or software to calculate calories burned during the exercise as seen in the flowchart of FIG. 3. Once the conversion circuit has been reset and there is an input weight from the sensor 11 through the circuit 20, the weight is calculated and if there is a communication command, the command is executed based on the measured weight. The cycle is repeated beginning from a point determined by reception of a reset command.

Figure 4:
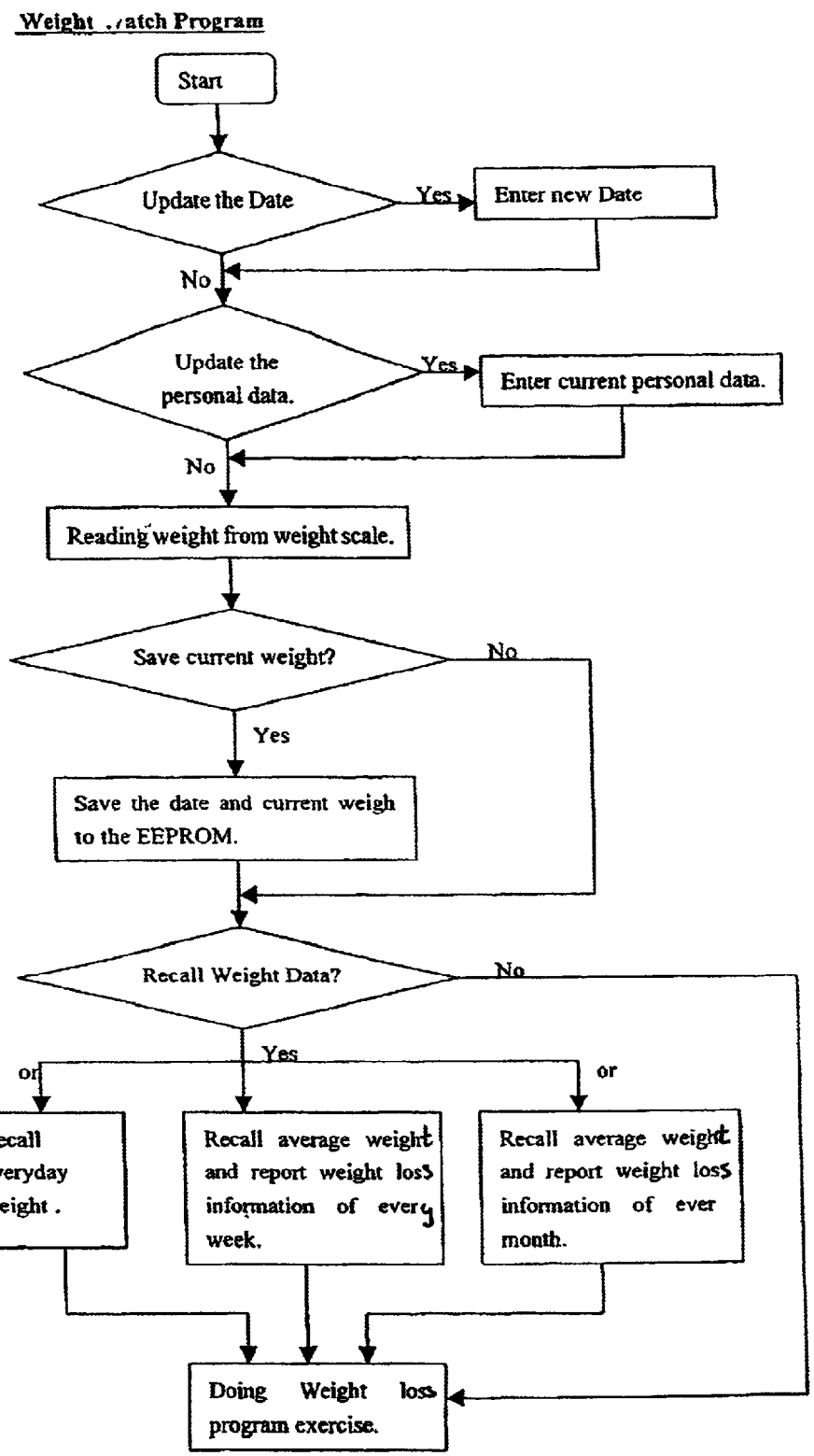
FIG. 4 is a flow chart of the weight watch program.

Furthermore, a weekly, monthly "weight-watch" program can correlate effective weight control with regular workout activities. Such a histogram can be stored, retrieved and presented on the console electronics display of the treadmill shown in FIG. 1. This provides positive motivation, showing weekly goals settings and achievements, so that that user can find regular exercise both informative and instrumental in motivating the exercise program. Such a weight-watch program is illustrated in the flow chart of FIG. 4.

The weight-watch program include a series of steps for entering a new date and current personal data. The resulting weight-scale readout can then be saved to the EEPROM of the circuit 20 in FIG. 2. Then this saved weight can be recalled for correlation with the date to provide the average weight and the reported weight loss for every week or every month or for every day. This information is made available to the exerciser.

For the more seasoned user, a targeted weight loss control program can be tailored according to the user's gender, age, height and weight condition. A full comprehensive, weight-tracking, interactive software can be designed within current levels of skill to demand weight-scale input whenever the user logs on and to generate the correct program for that user. The user's progress is measured and logged, ensuring that the user is getting maximum benefits from exercise and preventing overexertion in attempt to achieving quick results. This log makes the exercise "official" and notes any required comparison.

Figure 5A:
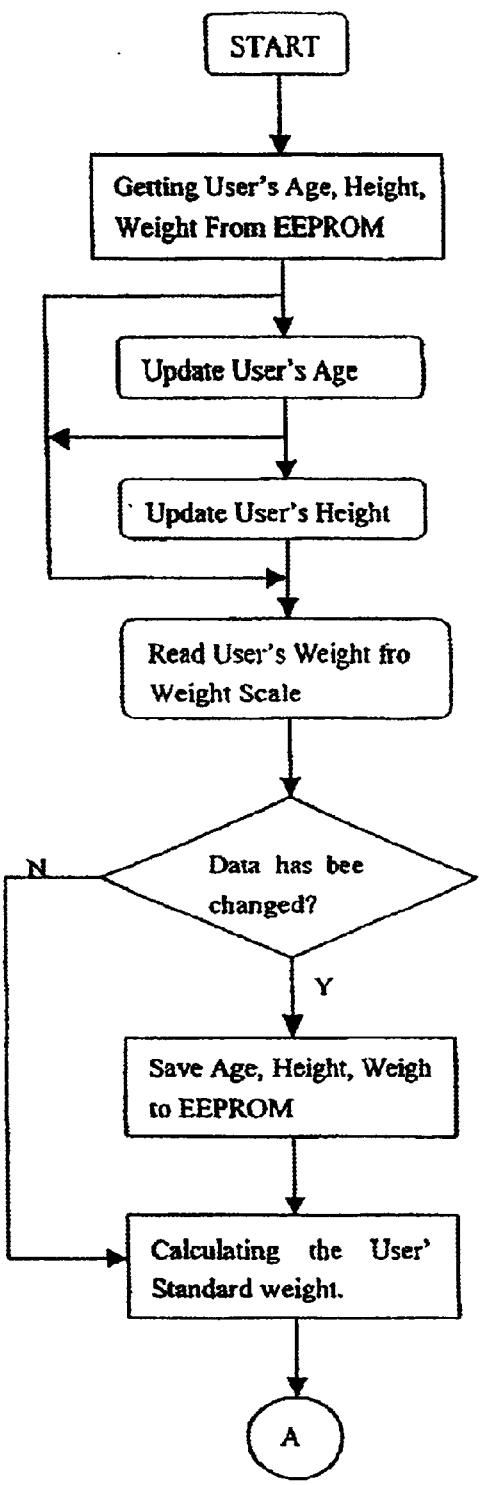
FIGS. 5A and 5B together constitute a flow chart of a weight loss control program of the present invention.
Figure 5B:
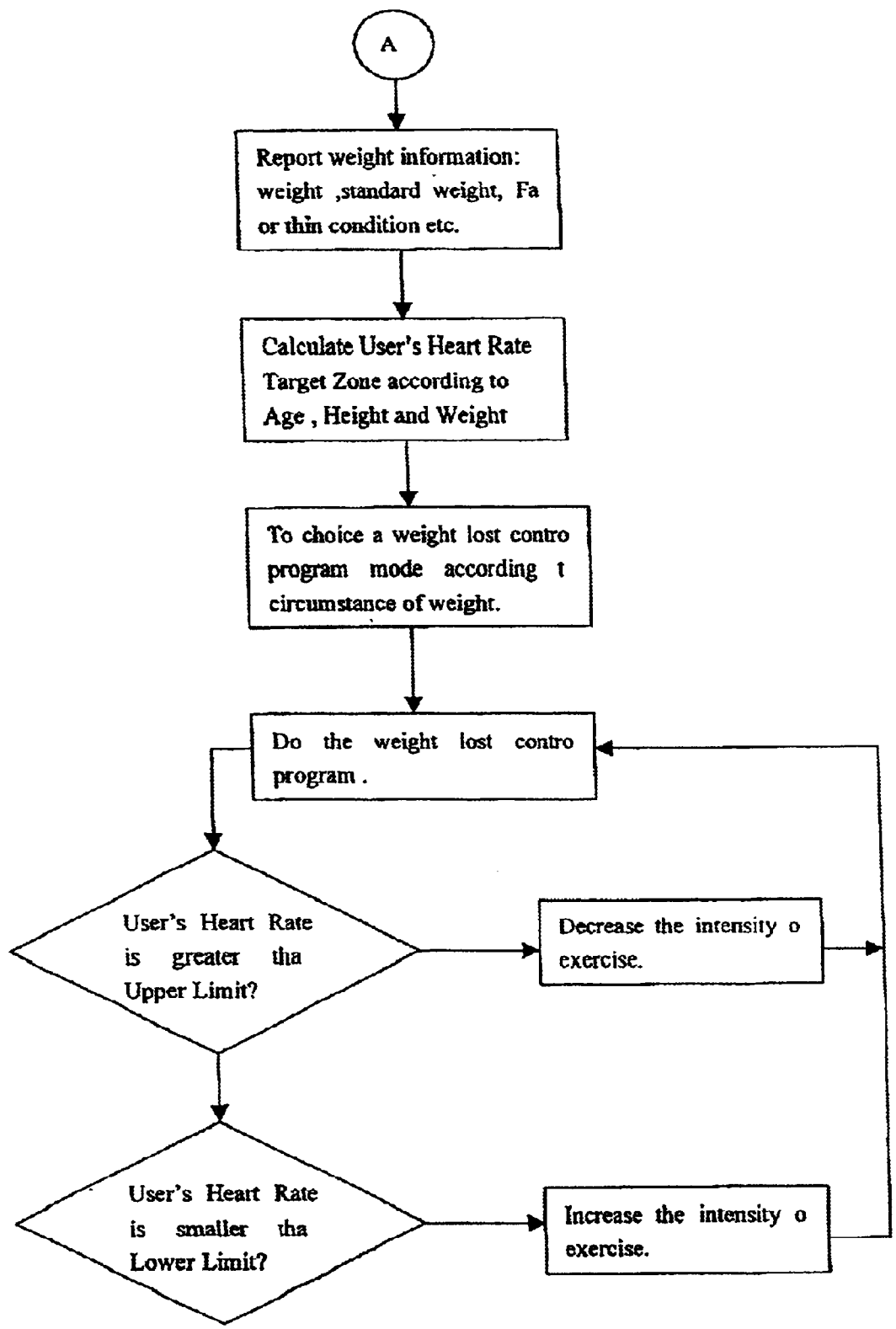

Such a targeted program can be of the type shown in the flow chart of FIGS. 5A and 5B. The flowchart of the targeted program obtains user information stored in the EEPROM and determines whether current data changes any of those values. Subsequently, the weight information is used to calculate a heart rate target zone according to that determined weight as well as according to the age and height. Furthermore, this flowchart shows automatic increase or decrease in the intensity of the exercise based on whether the exerciser's heart rate is above an upper limit or below a lower limit of the calculated target zone of the heart rate.

For other seasoned athletes using the treadmill, body fluid lost during vigorous and prolonged exercise, i.e. dehydration level, can be gauged by body weight measurement before and after each exercise. It is important to replenish body fluid lost due to sweating, i.e. to re-hydrate the user to his/her pre-exercise level. The present invention can implement that objective with an appropriate algorithm.

At a system level, the weight-scale module of FIG. 2 can further combine with a fat-analyzer module, and can also be used with an appropriate heart-rate control program for an "in target-zone training of the type shown in FIG. 5B" so that a peak performance weight watch, tuition package/tool can be made readily available to treadmill users.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exercise apparatus comprising:

a continuously movable exercise structure;

a fixed structure for supporting said movable structure, wherein said fixed structure includes a weight-scale sensing device, said weight-scale sensing device including at least one scale surface, and a measuring device for measuring the weight of a user positioned on said at least one weight surface;

electronic circuit device for storing said measured weight and for controlling the resetting of said sensing device;

a display and control console including programmable controller means for calculating calories lost by a user of said apparatus, including means for inputting weight data stored in said electronic circuit device.

2. The apparatus according to claim 1, wherein said electronic circuit device includes an electronically programmable memory for storing weight data.

3. The apparatus according to claim 1, wherein said at least one weight sensing surface includes a first weight sensing surface positioned on one side of said movable portion and a second weight sensing surface positioned on an opposite side of said movable surface.

4. The apparatus according to claim 1, wherein said movable surface is a treadmill surface and wherein said at least one weight-sensing surface includes a first weight-sensing surface on one side of said treadmill and a second weight-sensing surface on the opposite side of said treadmill for receiving a respective left and right foot placement of a user.

5. The apparatus according to claim 1, wherein said programmable controller means calculates the calories lost based on the formula:

$$Kcal./sec.=[\{weight \times (speed \times 50+\Delta)\} \times \{1+0.005(age-30)\} \times gender\ factor]1,000,000 (or\ 10^6),$$ where the gender-factor is male=100%, and female=90%.

6. An improved treadmill exercise device comprising:

a movable treadmill surface;

a fixed portion retaining said treadmill surface wherein said fixed portion includes a weight-sensing device for measuring the weight of a user, and wherein said weight-sensing portion includes an electronic programmable memory for storing data concerning the weight of said user;

console display means electrically connected to said weight-sensing device and said treadmill;

said console display means including a programmable control for calculating calories lost by said user during exercise on said treadmill as a function of a weight of said user stored in said programmable memory.

7. The treadmill apparatus according to claim 6, wherein said programmable control further includes a means for updating user information and correlating weight management of said user with use of said treadmill.

8. The device according to claim 6, wherein said programmable memory contains an exercise user's age and height.

9. The device according to claim 6, wherein said programmable controls further includes means for calculating heart rate of said user and a target zone according to age, height and weight, and means for controlling said treadmill to cause said user's heart rate to be retained within said target zone.

* * * * *